United States Patent [19]
Moriguchi et al.

[11] Patent Number: 5,926,381
[45] Date of Patent: Jul. 20, 1999

[54] DC POWER SUPPLY APPARATUS

[75] Inventors: Haruo Moriguchi, Itami; Toru Arai, Kyoto; Toshikazu Fujiyoshi, Kawanishi; Masayuki Ono, Toyonaka; Satoshi Hamada, Osaka; Hideo Ishii, Minoo, all of Japan

[73] Assignee: Sansha Electric Manufacturing Company, Limited, Osaka, Japan

[21] Appl. No.: 09/159,485

[22] Filed: Sep. 23, 1998

[30] Foreign Application Priority Data

Sep. 24, 1997 [JP] Japan .................................. 9-278126

[51] Int. Cl.⁶ .................................................. H02M 3/335
[52] U.S. Cl. ............................... 363/17; 363/98; 363/132
[58] Field of Search .................................. 363/16, 17, 97, 363/98, 131, 132; 219/130.1, 130.4, 130.31, 130.32, 137 PS, 130.51

[56] References Cited

U.S. PATENT DOCUMENTS

| | | | |
|---|---|---|---|
| 5,208,738 | 5/1993 | Jain ........................................... | 363/17 |
| 5,272,313 | 12/1993 | Karino et al. . | |
| 5,406,051 | 4/1995 | Lai ....................................... | 219/130.1 |
| 5,771,163 | 6/1998 | Moriguchi et al. ....................... | 363/71 |

FOREIGN PATENT DOCUMENTS 3-71218  11/1991  Japan .

OTHER PUBLICATIONS

Moriguchi et al.; copending patent application 08/968,054 filed Nov. 12, 1997 entitled "Power Supply Apparatus for Plasma Arc Utilizing Equipment".

Moriguchi et al.; copending patent application 09/152,017 filed Sep. 11, 1998 entitled "Inverter and DC Power Supply Apparatus with Inverter Used Therein".

Shikata et al.; copending patent application 09/175,830 filed Oct. 20, 1998 entitled "DC Power Supply Apparatus".

*Primary Examiner*—Matthew Nguyen
*Attorney, Agent, or Firm*—William H. Murray

[57] ABSTRACT

A DC power supply apparatus includes an input-side rectifier which rectifies an input AC voltage and supplies the rectified voltage to a voltage-boosting converter. The voltage-boosting converter converts the supplied voltage to a voltage of a predetermined magnitude. The predetermined magnitude voltage is, then, converted to a high-frequency voltage by an inverter and applied to a primary winding of a transformer. An output-side rectifier rectifies a high-frequency voltage induced in a secondary winding of the transformer. The inverter includes IGBTs and diodes, which are connected in a full-bridge configuration. A capacitor is connected in parallel with each IGBT. When the IGBTs are rendered conductive by the charging and discharging of the capacitors, no current flows through the IGBTs, and when the IGBTs are rendered nonconductive, the voltages applied to the IGBTs are made to become zero.

5 Claims, 2 Drawing Sheets

DC POWER SUPPLY APPARATUS

This application is based on Japanese Patent Application No. HEI 9-278126 filed on Sep. 24, 1997, which is incorporated herein by reference.

FIELD OF THE INVENTION

This invention relates to a DC power supply apparatus, which provides a DC voltage by converting an AC voltage into a DC voltage, and, more specifically, to such a DC power supply apparatus which produces a DC voltage to be supplied to a load, by converting an AC voltage into a first DC voltage, converting the first DC voltage to a high-frequency voltage, which is subsequently voltage-transformed by a transformer, and, then, converting the voltage-transformed high-frequency voltage to a second DC voltage, which is applied to the load.

BACKGROUND OF THE INVENTION

A DC power supply apparatus of the above-described type may be used for, for example, an arc welder, an arc cutter, a charger and an electroplating apparatus. In some areas, a plurality of AC voltages, e.g. voltages of 100 V and 200 V, or voltages of 200 V and 400 V, may be available, and a DC power supply apparatus may be arranged to operate from any one of such plural AC voltages. An example of DC power supply apparatuses which can operate from either of such different AC voltages includes a voltage-boosting converter. In this power supply apparatus, whatever AC voltage is inputted, the input AC voltage is rectified and voltage-boosted to a voltage having a predetermined value by the voltage-boosting converter. The voltage-boosted voltage is, then, converted to a high-frequency voltage by a high-frequency inverter, which, in turn, is voltage transformed. The resulting transformed high-frequency voltage is rectified and applied to a load.

The above-described DC power supply apparatus includes semiconductor switching devices in the inverter, which are switched at a high frequency. When the switching devices switch, both current and voltage are simultaneously applied to the switching devices, switching loss may occur. In order to reduce such switching loss, the switching frequency cannot be high. It has been only up to about 15 KHz at the highest.

An object of the present invention is to provide a DC power supply apparatus including an inverter that can operate at a high switching frequency with little switching loss and, at the same time, can provide a desired DC voltage from an input AC voltage of any magnitude.

SUMMARY OF THE INVENTION

A DC power supply apparatus according to the present invention includes an input-side rectifier coupled to an AC power supply providing an AC voltage of any magnitude, for rectifying the AC voltage. A constant voltage circuit receives the output voltage of the input-side rectifier and converts it into a voltage of a predetermined value. The output voltage of the constant voltage circuit is applied between input terminals of an inverter. The inverter converts it into a high-frequency voltage, which is developed between output terminals of the inverter. A transformer has a primary winding coupled between the output terminals of the inverter, and has a secondary winding in which a transformed version of the high-frequency voltage is induced. An output-side rectifier is coupled to the secondary winding of the transformer, for rectifying the transformed high-frequency voltage. The rectified voltage is applied to a load.

The inverter includes first and second circuits connected in parallel between the input terminals of the inverter. The first circuit includes first and second semiconductor switching devices each having a conduction path and a control electrode. The conduction path of each semiconductor switching device is made conductive when a control signal is applied to the control electrode while a voltage is being applied across the conduction path in a predetermined polarity. The conduction paths of the first and second semiconductor switching devices are connected in series with each other. The second circuit includes a pair of current conducting units connected in series. The junction between the conduction paths of the first and second semiconductor switching devices and the junction between the current conducting units provide output terminals of the inverter.

The first circuit further includes first and second diodes connected in parallel with the conduction paths of the first and second semiconductor switching devices, respectively. The first and second diodes are poled such that they are rendered conductive when a voltage is applied across the respective conduction paths in a polarity opposite to the said predetermined polarity. The first circuit includes also first and second capacitors connected in parallel with the first and second diodes, respectively.

A control unit provides control signals to the first and second semiconductor switching devices with a predetermined quiescent period. The quiescent period is a period during which no control signals is applied to the semiconductor switching devices.

A saturable reactor may be disposed between the secondary winding of the transformer and the output-side rectifier.

The inverter may be of a full-bridge configuration or of a half-bridge configuration.

BRIEF DESCRIPTION OF THE INVENTION

DESCRIPTION OF PREFERRED EMBODIMENT

Figure 1:
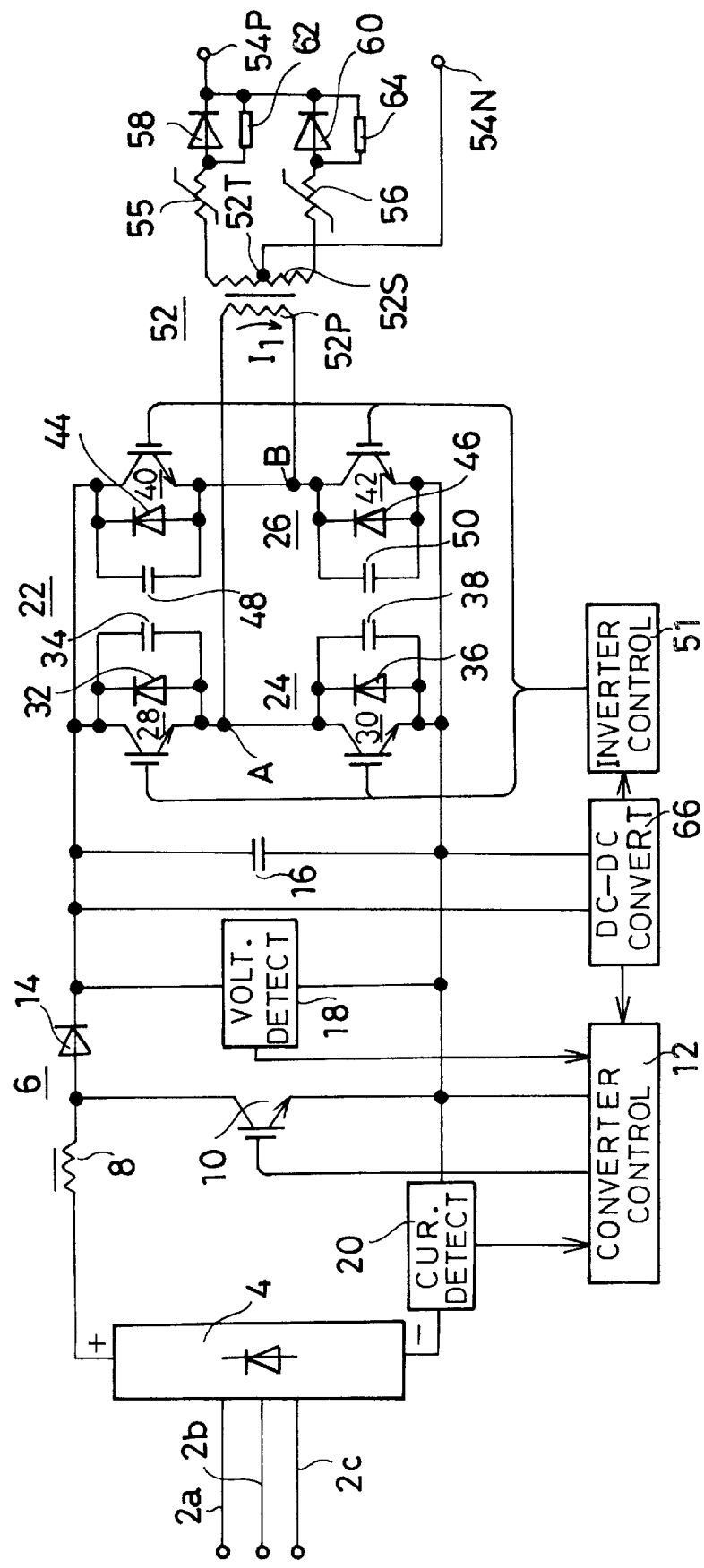
FIG. 1 is a block diagram of a DC power supply apparatus according to one embodiment of the present invention.

A DC power supply apparatus according to one embodiment shown in FIG. 1 may be used for supplying DC power to, for example, a DC arc welder or a DC arc cutter. The DC power supply has input terminals 2a, 2b and 2c. A three-phase commercial AC power supply is coupled to the input terminals 2a–2c. The three-phase commercial AC supply provides any one of a plurality of predetermined voltages.

The input terminals 2a–2c are coupled to an input-side rectifier 4, which rectifies a three-phase AC voltage applied to it. The rectifier 4 may be a full-wave rectifier circuit or a half-wave rectifier circuit.

The rectified voltage from the input-side rectifier 4 is applied to a constant voltage circuit, which may be, for example, a voltage-boosting converter 6. The voltage-boosting converter 6 has a smoothing reactor 8 having one end connected to a positive output terminal of the input-side rectifier 4. The other end of the reactor 8 is connected to a negative output terminal of the input-side rectifier 4 through the conduction path of a semiconductor switching device, for example, through the collector-emitter conduction path of an IGBT 10. A control signal is applied to the gate of the IGBT 10 from a converter control unit 12.

When the control signal is applied to the gate of the IGBT 10, the IGBT 10 becomes conductive, so that current flows through the smoothing reactor 8 and the IGBT 10, which results in storage of energy in the reactor 8. Upon disappearance of the control signal, the IGBT 10 is rendered nonconductive, so that counter electromotive force is generated in the smoothing reactor 8. The voltage based on this counter-electromotive force and the voltage from the input-side rectifier 4 are superposed on each other, and the resultant voltage is developed across the IGBT 10. In this way, the rectified voltage at the input-side rectifier output is boosted.

The boosted voltage is applied across a smoothing capacitor 16 through a reverse-current preventing diode 14, and is smoothed.

The voltage across the smoothing capacitor 16 is detected by a voltage detector 18, which develops a signal representative of the detected voltage. The voltage-representative signal is applied to the converter control unit 12.

A current detector 20 is coupled between the emitter of the IGBT 10 and the negative output terminal of the input-side rectifier 4. The current detector 20 detects current flowing through the voltage-boosting converter 6 and develops a signal representative of the detected current. The current-representative signal is also applied to the converter control unit 12.

The converter control unit 12 controls the duration of the control signal for the IGBT 10 in such a manner that the voltage-representative signal can have a value corresponding to a predetermined voltage, e.g. a voltage resulting from rectifying the highest one of possible three-phase AC voltages which may be applied to the input terminals 2a–2c and that the current-representative signal can be not greater than a value corresponding to a predetermined current. Thus, the voltage-boosting converter is of controlled type. When the voltage resulting from rectifying the three-phase AC voltage applied to the input terminals 2a–2c has the said predetermined value, the IGBT 10 remains nonconductive.

The controlled voltage-boosting converter 6 can develop a DC voltage of a predetermined value across the smoothing capacitor 16 whichever one of the possible AC voltages is applied to the input terminals 2a–2c.

The voltage developed across the capacitor 16 is applied to an inverter 22 for conversion to a high-frequency voltage. The inverter 22 has a parallel circuit of a first circuit 24 and a second circuit 26, which is connected across the smoothing capacitor 16, i.e. between input terminals of the inverter 22.

The first circuit 24 includes first and second semiconductor switching devices, e.g. IGBTs 28 and 30. Conduction paths, e.g. collector-emitter conduction paths, of the IGBTs 28 and 30 are connected in series with each other across the smoothing capacitor 16. A first diode 32 has its cathode connected to the collector of the IGBT 28, and has its anode connected to the emitter of the IGBT 28. That is, the diode 32 is connected in inverse parallel with respect to the collector-emitter path of the IGBT 28. A first capacitor 34 is connected in parallel with the diode 32. A second diode 36 is connected in inverse parallel with the collector-emitter conduction path of the IGBT 30, and a second capacitor 38 is connected in parallel with the diode 36.

The second circuit 26 includes third and fourth semiconductor switching devices, e.g. IGBTs 40 and 42. Similar to the IGBTs 28 and 30, the IGBTs 40 and 42 have their collector-emitter conduction paths connected in series, and the series circuit is connected across the smoothing capacitor 16. Third and fourth diodes 44 and 46 are connected in inverse parallel with the collector-emitter conduction paths of the IGBTs 40 and 42, respectively, and third and fourth capacitors 48 and 50 are connected in parallel with the third and fourth diodes 44 and 46, respectively. The IGBT 40, the diode 44 and the capacitor 48 form a current conducting unit, and the IGBT 42, the diode 46 and the capacitor 50 form another current conducting unit.

The junction between the collector-emitter conduction paths of the IGBTs 28 and 30 provides one output terminal A of the inverter 22, and the junction between the collector-emitter conduction paths of the IGBTs 40 and 42 provides the other output terminal B of the inverter 22.

An inverter control unit 51 applies control signals to the gates of the IGBTs 28, 30, 40 and 42, respectively, for PWM controlling them so as to develop a desired high-frequency voltage between the output terminals A and B of the inverter 22. The control signals are described in greater detail later.

As described above, the inverter 22 of FIG. 1 is designed as a full-bridge inverter with the IGBTs 28 and 42 being bridging elements in a pair of facing branches and with the IGBTs 30 and 40 being bridging elements in another pair of facing branches. In place of the IGBTs, bipolar transistors or FETs may be used.

Respective ends of a primary winding 52P of a transformer 52 are connected to the inverter output terminals A and B. The transformer 52 has a secondary winding 52S having an intermediate tap 52T, which is connected to a negative output terminal 54N of the DC power supply apparatus. One end of the secondary winding 52S is connected through a saturable reactor 55 and an output-side rectifier, e.g. a rectifying diode 58 to a positive output terminal 54P of the DC power supply apparatus. The other end of the secondary winding 52S is also connected to the positive output terminal 54P through a saturable reactor 56 and an output side rectifier, e.g. a rectifying diode 60. Resistors 62 and 64 are connected in parallel with the diodes 58 and 60, respectively.

The converter control unit 12 and the inverter control unit 51 are powered from a DC-to-DC converter 66. The DC-to-DC converter 66 is a step-down type converter, and receives and steps down the voltage developed across the smoothing capacitor 16 for application to the converter control unit 12 and the inverter control unit 51.

The inverter control unit 51 generates four control signals for the respective ones of the IGBTs 28, 30, 40 and 42. If a voltage is applied in a predetermined polarity across the collector-emitter conduction path of any of the IGBTs 28, 30, 40 and 42 while the corresponding control signal is being applied to it, it is rendered conductive.

In FIG. 2(a), first and second control signals C28 and C30 for the IGBTs 28 and 30, respectively, are indicated by a solid line and a dot-and-dash line. The control signals C28 and C30 are alternately generated with a quiescent period t disposed therebetween, during which neither the control signal C28 nor the control signal C30 is present. Similarly, third and fourth control signals C40 and C42 for the respective IGBTs 40 and 42 are shown in FIG. 2(b) by a solid line and a dot-and-dash line, respectively. The control signals C40 and C42 are alternately generated, with the quiescent period t disposed therebetween, during which neither the control signal C40 nor the control signal C42 is present.

As is seen from the illustration in the latter half portions of FIGS. 2(a) and 2(b), the control signal C42 for the IGBT42 has a predetermined phase difference from the control signal C28 for the IGBT 28. In the illustrated embodiment, the control signal C42 is phase delayed by a predetermined amount from the control signal C28. There is a time period during which both control signals C28 and C42 are present, but the control signal C42 continues after the control signal C28 disappears. During the quiescent time period t between the disappearance of the control signal C28 and the occurrence of the control signal C30, too, the control signal C42 is present. The control signal C42 disappears after the control signal C30 is generated.

Similarly, the control signal C40 for the IGBT 40 has a phase difference with respect to the control signal C30 for the IGBT 30. For example, the control signal C40 is delayed in phase by a predetermined amount from the control signal C30. For some time period, both control signals C30 and C40 are present simultaneously, but the control signal C40 continues after the control signal C30 disappears. The control signal C40 is present also during the quiescent time period t between the disappearance of the control signal C30 and the occurrence of the control signal C28, and disappears only after the control signal C28 is generated.

Depending on the states of these control signals, the IGBTs 28, 30, 40 and 42 are rendered conductive or nonconductive, and, therefore, the capacitors 34, 38, 48 and 50 are discharged and charged. The time constants of the capacitors 34, 38, 48 and 50 are determined such that the time required for the capacitors to charge or discharge can be shorter than the quiescent period t.

Figure 2:
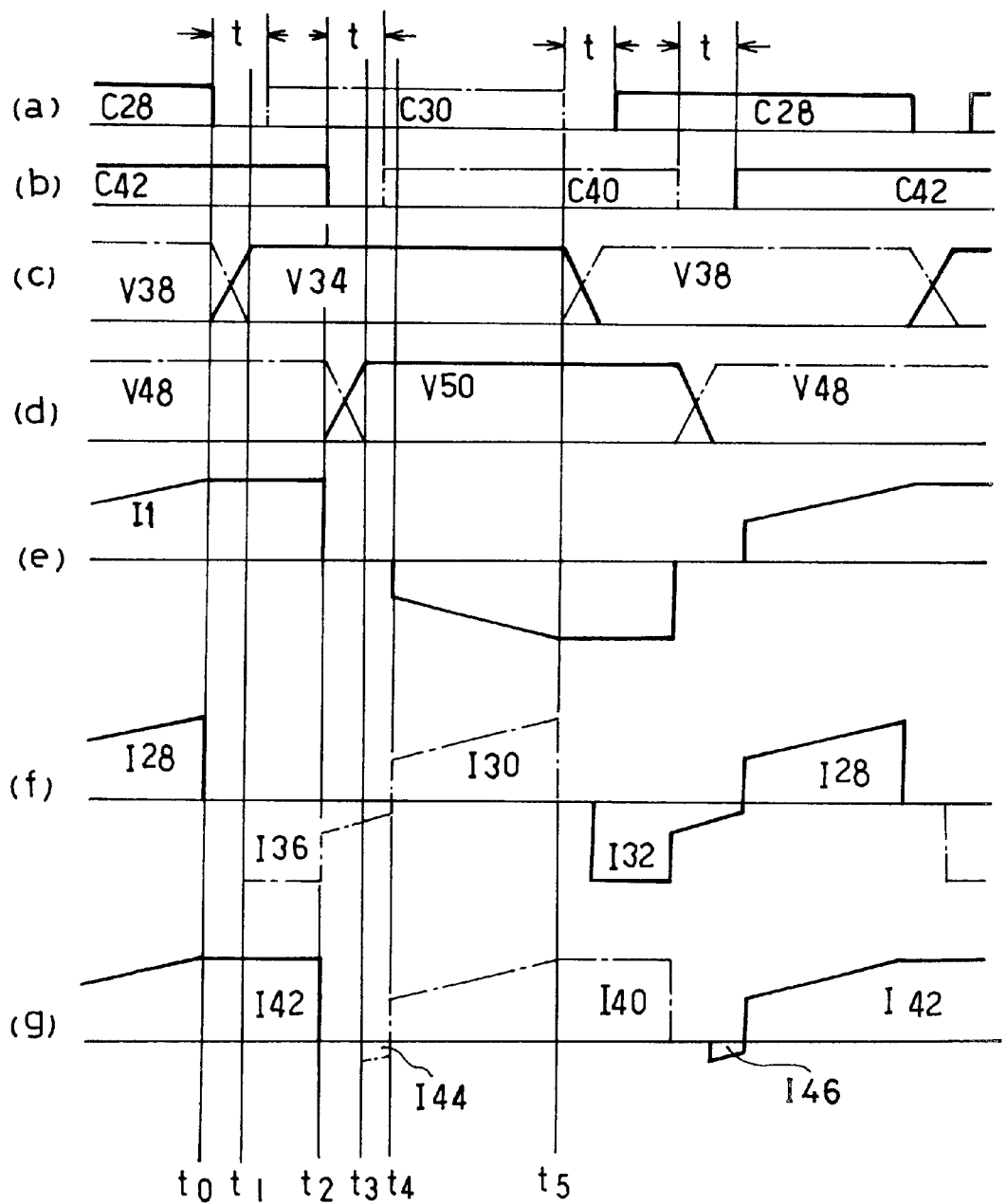
FIG. 2 shows waveforms at various portions of the DC power supply apparatus shown in FIG. 1.

Now, the operation of the inverter 22 is described with reference to FIG. 2.

Let it be assumed that the control signals C28 and C42 are applied to the IGBTs 28 and 42 before a time t0 as shown in FIGS. 2(a) and 2(b), so that the IGBTs 28 and 42 are conductive. As a result, current flows through the IGBT 28, the primary winding 52P of the transformer 52 and the IGBT 42. Since the IGBTs 28 and 42 are conductive, the capacitors 34 and 50 connected in parallel with the IGBTs 28 and 42, respectively, are discharging, as represented by solid-line waveforms V34 and V50 shown in FIGS. 2(c) and 2(d), respectively. On the other hand, the capacitors 48 and 38 connected in parallel with the nonconductive IGBTs 40 and 30, respectively, are charged as represented by dot-and-dash-line waveforms V48 and V38 shown in FIGS. 2(d) and 2(c), respectively.

When the control signal C28 disappears at the time t0 as shown in FIG. 2(a), the IGBT 28 becomes nonconductive, and current 128 which has been flowing in the IGBT 28 also disappears as shown in FIG. 2(f). This initiates the charging of the capacitor 34 connected in parallel with the IGBT 28 and also initiates the discharging of the capacitor 38 connected in parallel with the IGBT 30, as shown in FIG. 2(c). Accordingly, even after the current 128 ceases to flow, the charging current and the discharging current flow through the primary winding 52P of the transformer 52 as current 11 indicated by solid lines in FIG. 2(e).

At a time t1, the charging of the capacitor 34 and the discharging of the capacitor 38 end and, at the same time the diode 36 is freed from the reverse biased state. It causes energy stored in the primary winding 52P of the transformer 52 to be released, which results in circulating current to flow from the primary winding 52P through the IGBT 42 and the diode 36 back to the primary winding 52P. Thus the current 11 continues to flow through the primary winding 52P of the transformer 52. Current 136 flowing through the diode is shown in FIG. 2(f), and current 142 flowing through the IGBT 42 is shown in FIG. 2(g).

Since the current 11 flows from before the time t0, the saturable reactor 55 is in the saturated condition and, therefore, current is supplied through the diode 58 to the load. The saturated condition of the reactor 55 is maintained after the IGBT 28 is nonconductive. Soon after, the control signal C30 for the IGBT 30 is generated, but, since the energy in the primary winding 52P of the transformer 52 has been released, the nonconductive state of the IGBT 30 is maintained.

At a time t2, the control signal C42 for the IGBT 42 disappears, so that the IGBT 42 becomes nonconductive. Then, the charging of the capacitor 50 starts. The voltage across the capacitor 50 starts increasing as indicated by the solid-line waveform V50 shown in FIG. 2(d). At the same time, the charge on the capacitor 48 is discharged through the smoothing capacitor 16, the diode 36 and the primary winding 52P of the transformer 52, so that the voltage across the capacitor 48 decreases as indicated by the dot-and-dash-line waveform V48 shown in FIG. 2(d). Due to the discharge of the capacitor 48, the voltage at the output terminal B of the inverter 22, which has been lower than the voltage at the output terminal A, becomes higher than the voltage at the output terminal A.

Since the voltage at the output terminal B has become higher than the voltage at the output terminal A, the voltage induced in the secondary winding 52S of the transformer 52 also reverses. However, at a time immediately following the voltage reversal, the voltage induced in the secondary winding 52S is low and, therefore, no current flows in the output-side rectifying diode 60. Accordingly, the saturable reactor 56 remains in its unsaturated state.

Further, the diode 58 is reverse-biased and nonconductive, and, therefore, the current flowing through the saturable reactor 55 becomes zero. This causes the saturable reactor 55 to become unsaturated.

At a time t3, the diode 44 becomes conductive due to decrease of the voltage across the capacitor 48. A circulating current based on the energy in the primary winding 52P flows through the diode 44, the smoothing capacitor 16 and the diode 36 back to the primary winding 52P. The control signal C40 is applied to the IGBT 40 when the circulating current is flowing, but the IGBT 40 does not conduct due to the circulating current. Current 144 flowing through the diode 44 is shown in FIG. 2(g).

At a time t4, the IGBTs 30 and 40 are rendered conductive, so that currents 130 (FIG. 2(f)) and 140 (FIG. 2(g)) flow respectively therethrough. Thus, current 11 flows through the primary winding 52P of the transformer 52 in the direction opposite to the direction indicated by an arrow in FIG. 1, as shown in FIG. 2(e). It causes the saturable reactor 56 to be saturated, and current is supplied to the load through the diode 60.

At a time t5, the control signal C30 for the IGBT 30 disappears. Thus, a half cycle of the operation has been completed. After that, a similar switching operation is repeated for another half cycle to complete one cycle of operation.

A waveform 132 shown in FIG. 2(f) represents current flowing through the diode 32, and a waveform 146 shown in FIG. 2(g) represents current flowing through the diode 46.

It should be noted that power is returned to the smoothing capacitor 16 by the above-described discharge of the capacitor 48 and the subsequent release of energy from the primary winding 52P of the transformer 52.

As described above, only after the control signal for each of the IGBTs 28, 30, 40 and 42 disappears and the current through the IGBT becomes zero, the voltage across the associated capacitor 34, 38, 48 or 50, which applies a voltage across the collector-emitter conduction path of the IGBT increases. Also, only after the voltage across each of the capacitors 34, 38, 48 and 50, which provides a voltage across the collector-emitter conduction path of the associated IGBT 28, 30, 40 or 42, becomes zero, current starts to flow through the collector-emitter conduction path of the associated IGBT. In other words, it never occurs that both voltage and current are simultaneously applied to the collector-emitter conduction paths of the IGBTs 28, 30, 40 and 42. Thus, the switching loss, which would otherwise caused, can be suppressed. Since the switching loss is small, the inverter 22 can be operated at a higher switching frequency, which makes it possible to use a smaller transformer, so that the size of the DC power supply apparatus as a whole can be small.

In the above-described DC power supply apparatus, the inverter 22 is a full-bridge inverter, but a half-bridge inverter may be used instead. In such a case, the IGBTs 28 and 30 and the diodes 32 and 36 may be removed. The retained capacitors 34 and 38 function as current conducting units. Alternatively, the IGBTs 40 and 42 and the diodes 44 and 46 may be removed. In this case, the capacitors 48 and 50 act as current conducting units.

In the described embodiment, the saturable reactors 55 and 56 are used to make it surer to prevent simultaneous application of current and voltage to the collector-emitter conduction path of the IGBT, by delaying the current flowing through each of the IGBTs 28, 30, 40 and 42. If necessary, however, the saturable reactors 55 and 56 may be removed.

The above-described DC power supply apparatus employs a voltage-boosting converter as a constant voltage circuit, but it may employ a voltage step-down converter of which the output voltage is detected and controlled to become constant.

What is claimed is:

1. A DC power supply apparatus comprising:
    an input-side rectifier adapted to be coupled to an AC power supply which can provide an AC voltage of a value and to rectify the AC voltage applied thereto;
    a constant voltage circuit receiving an output voltage of said input-side rectifier for converting said output voltage to a voltage having a predetermined value;
    an inverter for converting an output voltage of said constant voltage circuit to a high-frequency voltage and developing the high-frequency voltage between output terminals thereof;
    a transformer having a primary winding coupled between said output terminals of said inverter and having a secondary winding in which a voltage-transformed version of said high-frequency voltage is induced; and
    an output-side rectifier coupled to said secondary winding of said transformer for rectifying said voltage transformed version of high-frequency voltage for application to a load;
    wherein:
        said inverter includes first and second circuits connected in parallel between input terminals of said inverter;
        said first circuit comprising first and second semiconductor switching devices each having a conduction path and a control electrode, the conduction paths of said first and second semiconductor switching devices being rendered conductive when first and second control signals are applied to the control electrodes of said first and second semiconductor switching devices, respectively, while a voltage is being applied in a predetermined polarity across said conduction paths, the conduction paths of said first and second semiconductor switching devices being connected in series with each other;
        said second circuit comprising a pair of current conducting units connected in series with each other;
        the junction between said first and second semiconductor switching devices and the junction between said current conducting units providing said output terminals of said inverter, whereby said first and second semiconductor switching devices and said pair of current conducting units form a bridge circuit;
        said first circuit further comprising first and second diodes connected in parallel with the conduction paths of said first and second semiconductor switching devices, respectively, and first and second capacitors connected in parallel with said first and second diodes, respectively, each of said diodes being so poled as to be rendered conductive when a voltage is applied across the conduction path of the associated semiconductor switching device in a polarity opposite to said predetermined polarity;
        said inverter further comprising a control unit for providing alternately said first and second control signals respectively to said first and second semiconductor switching devices with a quiescent period disposed therebetween.

2. The DC power supply apparatus according to claim 1 further comprising a saturable reactor disposed between said secondary winding of said transformer and said output-side rectifier.

3. The DC power supply apparatus according to claim 1 wherein said pair of current conducting units of said second circuit of said inverter comprise third and fourth semiconductor switching devices, respectively, each of said third and fourth semiconductor switching devices having a conduction path and a control electrode, the conduction paths of said third and fourth semiconductor switching devices being rendered conductive when third and fourth control signals are applied to the control electrodes of said third and fourth semiconductor switching devices, respectively, while a voltage is being applied in a predetermined polarity across said conduction paths, the conduction paths of said third and fourth semiconductor switching devices being connected in series, with said third semiconductor switching device being in a branch of said bridge circuit facing the branch including said second semiconductor switching device and with said fourth semiconductor switching device being in a branch facing the branch including said first semiconductor switching device;
    said current conducting units further comprising third and fourth diodes connected in parallel with said third and fourth semiconductor switching devices, respectively, and third and fourth capacitors connected in parallel with said third and fourth diodes, respectively;
    said control unit further providing alternately said third and fourth control signals to be applied to the control electrodes of said third and fourth semiconductor switching devices, respectively, with a quiescent period disposed therebetween;
    said first and fourth control signals having a predetermined phase difference therebetween, said second and third control signals having a predetermined phase difference therebetween.

4. The DC power supply apparatus according to claim 2 wherein said pair of current conducting units of said second circuit of said inverter comprise third and fourth semiconductor switching devices, respectively, each of said third and fourth semiconductor switching devices having a conduction path and a control electrode, the conduction paths of said third and fourth semiconductor switching devices being rendered conductive when third and fourth control signals are applied to the control electrodes of said third and fourth semiconductor switching devices, respectively, while a voltage is being applied in a predetermined polarity across said conduction paths, the conduction paths of said third and fourth semiconductor switching devices being connected in series, with said third semiconductor switching device being in a branch of said bridge circuit facing the branch including said second semiconductor switching device and with said fourth semiconductor switching device being in a branch facing the branch including said first semiconductor switching device;

said current conducting units further comprising third and fourth diodes connected in parallel with said third and fourth semiconductor switching devices, respectively, and third and fourth capacitors connected in parallel with said third and fourth diodes, respectively;

said control unit providing alternately said third and fourth control signals to be applied to the control electrodes of said third and fourth semiconductor switching devices, respectively, with a quiescent period disposed therebetween;

said first and fourth control signals having a predetermined phase difference therebetween, said second and third control signals having a predetermined phase difference therebetween.

5. The DC power supply apparatus according to claim 1 wherein said constant voltage circuit is a voltage-boosting circuit.

* * * * *